No. 816,620. PATENTED APR. 3, 1906.
E. A. TURNER.
AUTOMOBILE TURN TABLE.
APPLICATION FILED AUG. 7, 1905.
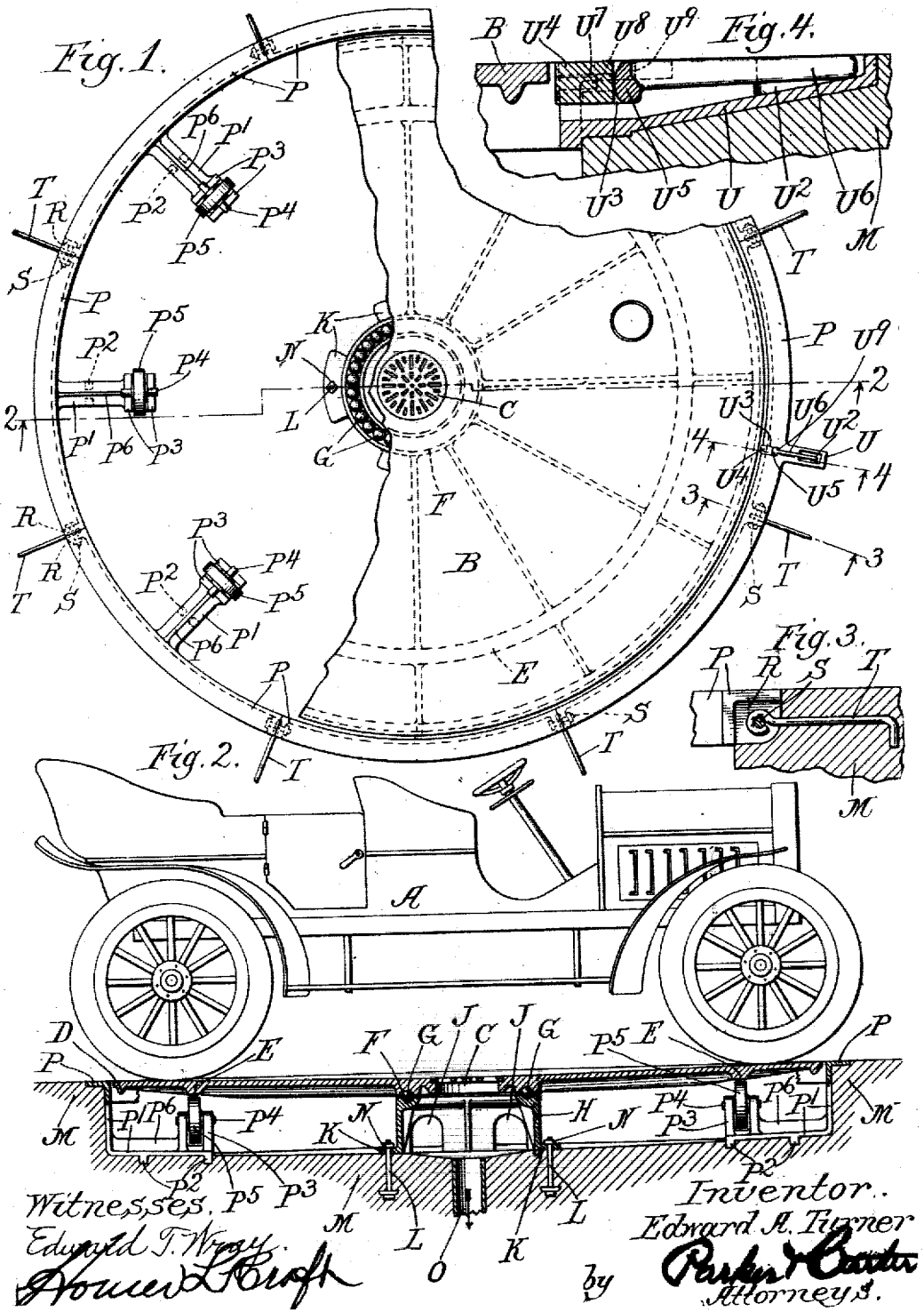
Witnesses
Inventor
Edward A. Turner

UNITED STATES PATENT OFFICE.

EDWARD A. TURNER, OF CHICAGO, ILLINOIS.

AUTOMOBILE TURN-TABLE.

No. 816,620.  Specification of Letters Patent.  Patented April 3, 1906.

Application filed August 7, 1905. Serial No. 272,960.

*To all whom it may concern:*

Be it known that I, EDWARD A. TURNER, a citizen of the United States, residing at Chicago, in the county of Cook and State of Illinois, have invented a certain new and useful Improvement in Automobile Turn-Tables, of which the following is a specification.

My invention relates to turn-tables for automobiles and the like, and has for its object to provide certain new and useful improvements more specifically hereinafter set forth.

It is illustrated in the accompanying drawings, wherein—

Figure 1 is a plan view of a turn-table with parts broken away. Fig. 2 is a cross-section of the same with an automobile in position. Fig. 3 is a detail of a device for locking the pit-rim pieces in position, being a cross-section on the line 3 3 of Fig. 1. Fig. 4 is a detail of the brake mechanism, being a cross-section on the line 4 4 of Fig. 1.

Like parts are indicated by the same letter in all the figures.

A is an automobile; B, the turn-table platform on which it rests. This table is shown dish-shaped or inwardly inclined toward its center, which contains a grating C. The purpose is to have the table shaped and arranged so that it may serve as a wash-table. It is obvious, therefore, that it might drain toward some other point than the center or even toward the edge, and the grating or open-work might extend over any or all portions of the table. I have shown what I consider my preferred form. The lower side of this table has the flange D, the annular track E, and the grooved annular bearing F, resting upon the balls G G, which are contained in an annular groove or raceway in the top of the thimble-shaped or cylindrical bearing or pedestal H. This bearing is provided with the openings J J and the outwardly-projecting lugs K K, through which pass the bolts L L, which are embedded in the concrete M. The thimble-shaped bearing is held down by the nuts N N. The concrete M forms a pit, the bottom of which is dish-shaped or inwardly inclined toward the central sewer-pipe O, which is preferably at the center of the pit and beneath the grating C. Thus liquids on the table or in the pit are free to flow out through the sewer-pipe O. I have described the pit as made of concrete. Obviously it may be made of other materials. If the floor with which the turn-table is flush were elevated a considerable distance, the pit might take the form of a pan. Moreover, I have shown, to harmonize with the dish-shaped platform, which may also be called a "wash-table," a dish-shaped bottom for the pit. Clearly this bottom might be shaped so as to incline in any direction. If in any case the sewer connection be placed in position at one side of the space to be occupied by the turn-table, it might be desirable to shape the bottom so as to have it pitch toward the sewer-opening even though the same should not be in the middle. The pit or pan may be set in the floor when there is a basement.

P P are pit-rim pieces L-shaped in cross-section and provided each with a downwardly and inwardly projecting arm P', having the anchor-pieces P² P² and the standards P³ P³, in which is mounted the shaft P⁴, carrying the bearing-wheel P⁵, on which the track E rests. Thus the platform B is supported within the pit on the wheels P⁵ P⁵ and the balls G G. P⁶ is a strengthening-rib on the arm P'. The flanges R R, bolts S S, and anchor-piece T tend to hold the pit-rim in proper position.

I have shown a brake; but being no part of my invention and not claimed I shall briefly describe it. U is a pocket on one rim-piece P, enlarged at U² and U³ to receive the brake-block U⁴, handle U⁵, and cam-shaped head U⁶. Grooves U⁷ receive projections U⁸ and hold the block in position, while the curved walls U⁹ furnish a bearing for the head. The wheels P⁵ beneath the table near its periphery are intended to facilitate turning of the table when the latter is overbalanced. When the machine is in its proper position, the weight is carried by the balls.

Broadly considered my invention presents the combination of a rotary wash-table, adapted to shed the water which falls upon it, with a pit or pan adapted to pitch the water which it receives toward some proper discharge place or opening. Such a contrivance greatly facilitates the washing or treatment of a vehicle, because it can be turned to be brought into proper relations with water, light, and other fixtures. It also makes it much easier to handle automobiles or other like vehicles, which under existing conditions have frequently to be backed in or out of the garage. The effective size of the garage-room is greatly increased. The turn-table under adverse circumstances or in a small barn or garage will greatly facilitate the entrance and exit head first of the automobile, and particularly facilitate the turning of machines which have long frames or widely-separated wheels.

I have spoken of "automobiles," and I wish that term to be understood broadly, so as to include any wheeled vehicle which may be properly used with such a contrivance.

I do not wish to be limited to the precise form, arrangement, proportion, and structure of these several parts; but I wish my drawings to be taken as in a sense diagrammatic and intended to illustrate in a general way the structure and mode of operation of my device without confining me to the particular details shown.

The use and operation of my invention are perhaps already sufficiently set forth; but I shall briefly recite them again. In the first place the turn-table is practically flush with the floor of the building and does not in any way interfere with the use of the adjacent floor-space. When the automobile is in position on the table, it may be cleaned or washed, or oiled, or otherwise treated and operated upon, and the debris will be carried off by the water or liquid toward the center of the dish-shaped table or into the pit. Whatever water there may be in or about the turn-table will pass into the pit and toward the center, and thus all of the liquid and debris whose presence results from cleaning or otherwise caring for the automobile will be carried easily and naturally down into the sewer connection. The rim of the pit and the other parts, particularly those which support the balls and the wheels above which the table is carried, are securely mounted and anchored in a permanent manner. Since the rotating platform of the turn-table is dish-shaped, the automobile when in position thereon tends to remain in position without any special locking device.

In the preferred form, as stated above, the rotating platform and the pit are dish-shaped and their points of discharge coincide on the axis of rotation; but the essential thing is that the water is shed by the rotating table and collected for discharge by the pit.

I claim—

1. A turn-table for automobiles and the like comprising a rotatable water-shedding wash-platform with a pit adapted to receive and collect such water, a discharge connection leading from the pit and suitable devices on which the table is mounted above and in association with the pit.

2. A turn-table for automobiles and the like comprising a rotatable dish-shaped water-shedding wash-platform with a pit having a water-collecting bottom and adapted to receive and collect such water, a discharge connection leading from the lowest point of such pit and suitable devices on which the table is mounted above and is associated with the pit.

3. A turn-table for automobiles and the like comprising a rotatable dish-shaped water-shedding wash-platform having a central aperture, with a pit having a dish-shaped bottom, and adapted to receive and collect such water, a discharge connection leading from the lowest point of said pit, and suitable devices on which the table is mounted above and in association with the pit.

4. A turn-table for automobiles comprising a pit with a series of angular curved rim-pieces thereabout, inwardly-projecting arms from such rim-pieces, wheels supported on said arms and a platform rotatably mounted above said wheels.

5. A turn-table for automobiles comprising a pit, a central pedestal with open sides rising therein, anchors therefor embedded in the floor of the pit, a raceway for balls in the top of the pedestal and a rotatable platform mounted upon said balls.

6. A turn-table for automobiles comprising a pit, a central hollow cylindrical pedestal rising therein, anchors therefor embedded in the floor of the pit, a raceway for balls in the top of the thimble and a rotatable platform mounted upon said balls, said pedestal provided with openings in its sides, and said pit provided with a central discharge-aperture beneath the thimble.

7. A turn-table for automobiles comprising a rotary platform with a pit and suitable supporting parts, said pit provided with a series of angular curved rim-pieces which are flanged at their adjacent ends, a cross-bolt through the flanges, and an anchor-piece connected with said bolt and embedded in the wall of the pit.

EDWARD A. TURNER.

Witnesses:
 GEO. S. WILLIAMS,
 L. M. DOWNIN.